United States Patent [19]

Leuthard

[11] 4,222,700
[45] Sep. 16, 1980

[54] UNIDIRECTIONAL ROTATION TURBINE APPARATUS WITH REVERSE FLOW

[76] Inventor: Ronald P. Leuthard, Rte. 1, Box 292, Isanti, Minn. 55040

[21] Appl. No.: 972,523

[22] Filed: Dec. 22, 1978

[51] Int. Cl.³ .................. F01D 25/28; F03B 3/04; F03B 3/16
[52] U.S. Cl. ............................ 415/7; 415/91; 415/193; 415/199.5
[58] Field of Search ............ 415/2 A, 3, 4, 7, 91, 415/193, 199.4, 199.5, 213 C; 417/336

[56] References Cited

U.S. PATENT DOCUMENTS

| 135,459 | 2/1873 | Yarrell | 415/199.4 X |
| 1,396,609 | 11/1921 | Weisenborn | 415/7 |

FOREIGN PATENT DOCUMENTS 1296691  5/1962  France ...................... 415/193

Primary Examiner—Leonard E. Smith
Attorney, Agent, or Firm—Clayton R. Johnson

[57] ABSTRACT

Turbine apparatus that includes a tubular housing, a rotor assembly drivingly mounted on a shaft and having a hub and a plurality of circumferentially spaced, generally V-shaped blades extending radially outwardly of the rotor hub, each rotor blade having first and second leg portions oppositely inclined relative to a plane perpendicular to the shaft that passes through the vertex of the blade, first and second stator assemblies on axially opposite sides of the rotor assembly that have a plurality of circumferential spaced blades that are respectively inclined relative to said plane at about the same angle as the adjacent set of the first and second leg portions, at least one stator assembly having the shaft rotatably extended therethrough, whereby the rotor assembly will be driven in the same direction whether fluid passes through the housing in one axial direction or the opposite axial direction. More than one set of first and second stator and rotor assemblies may be provided in the housing.

In a second embodiment the turbine apparatus is mounted on a float, for example a barge or ship, and the rotor assembly has gear teeth that drive a gear mounted in a gear housing.

9 Claims, 8 Drawing Figures

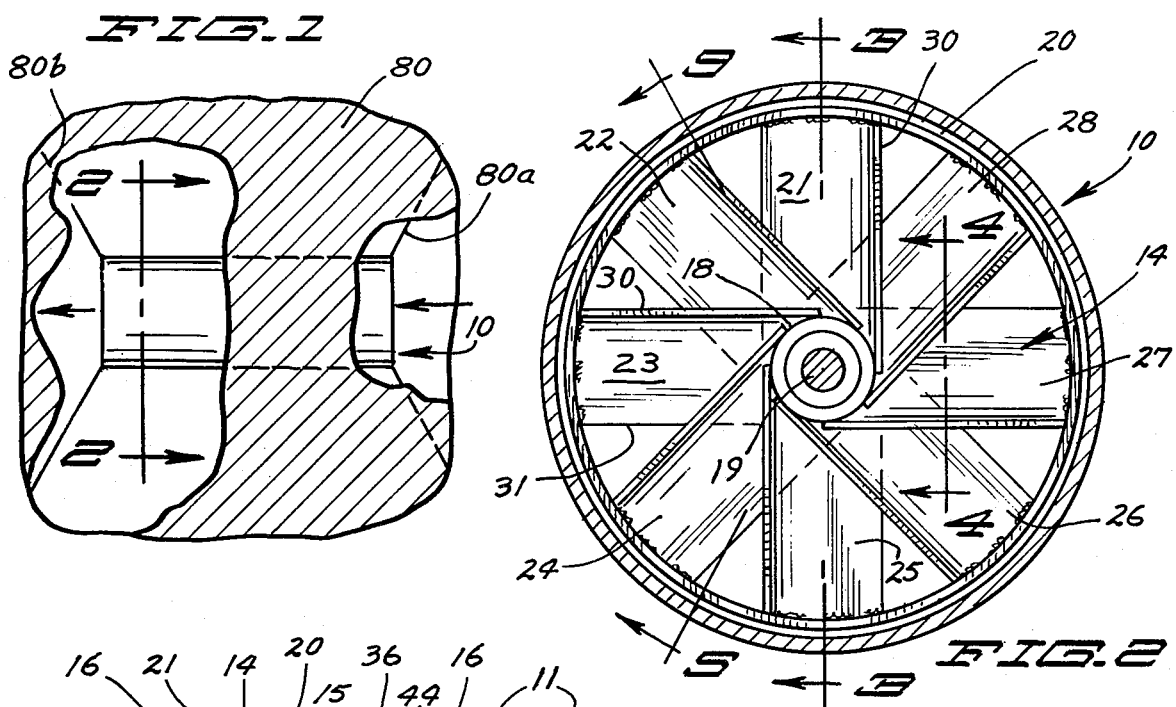
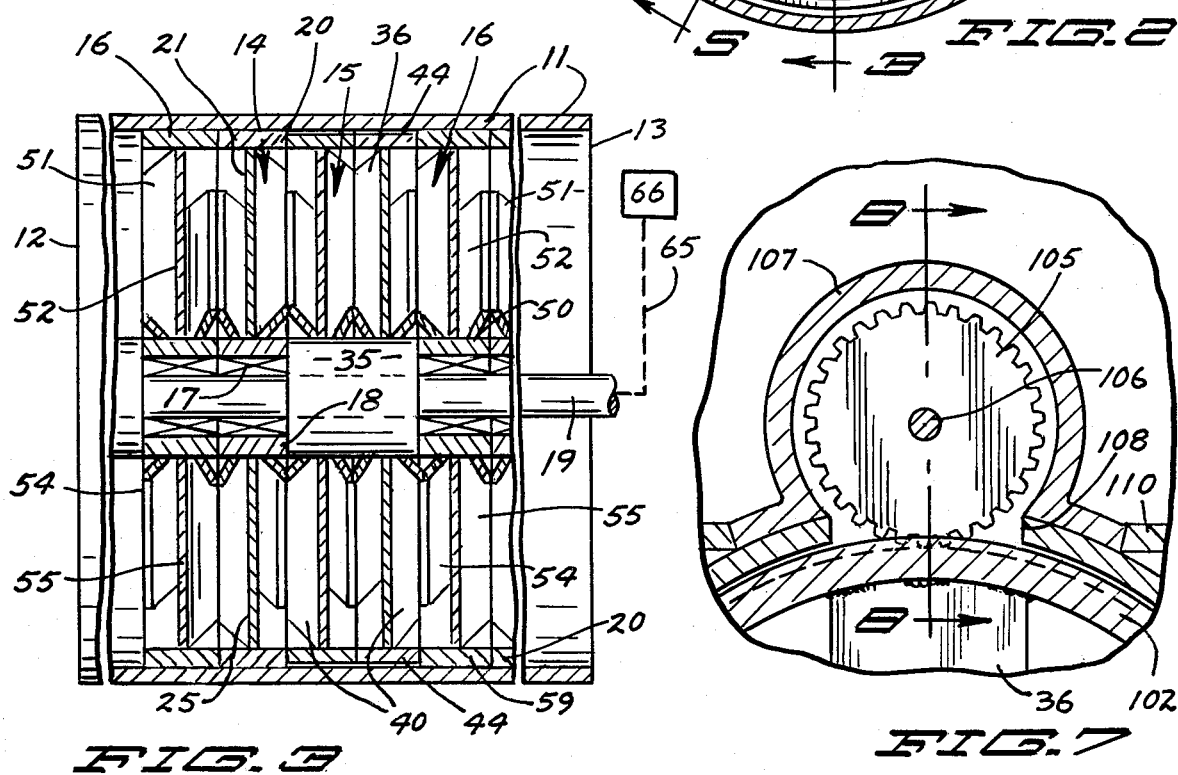
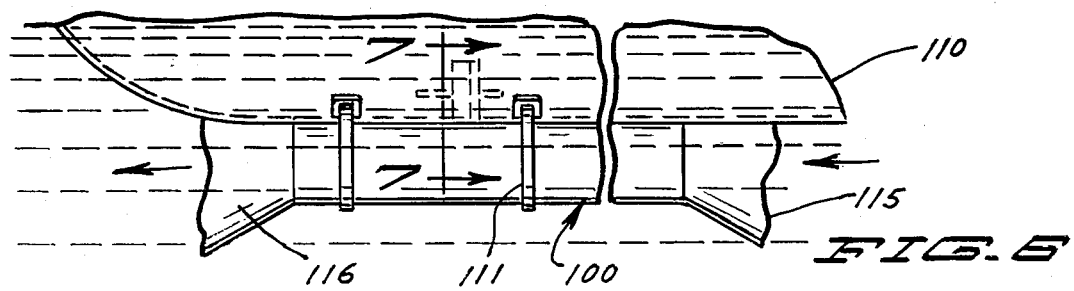

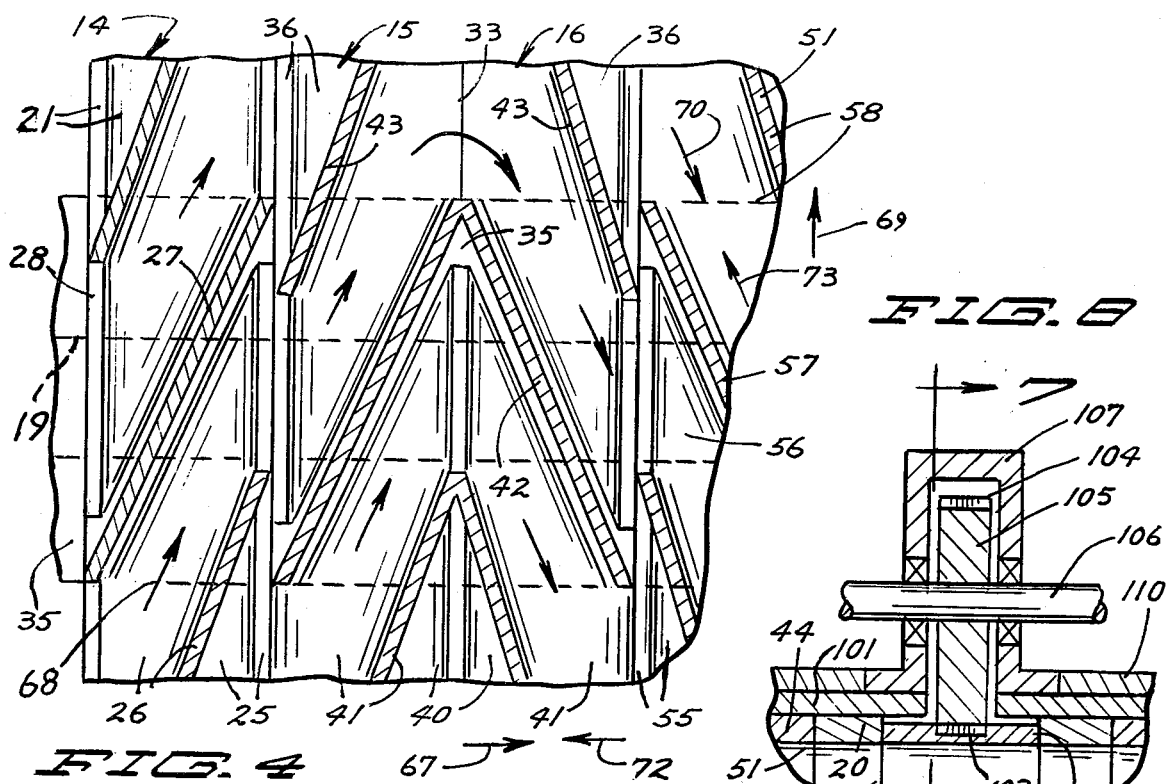
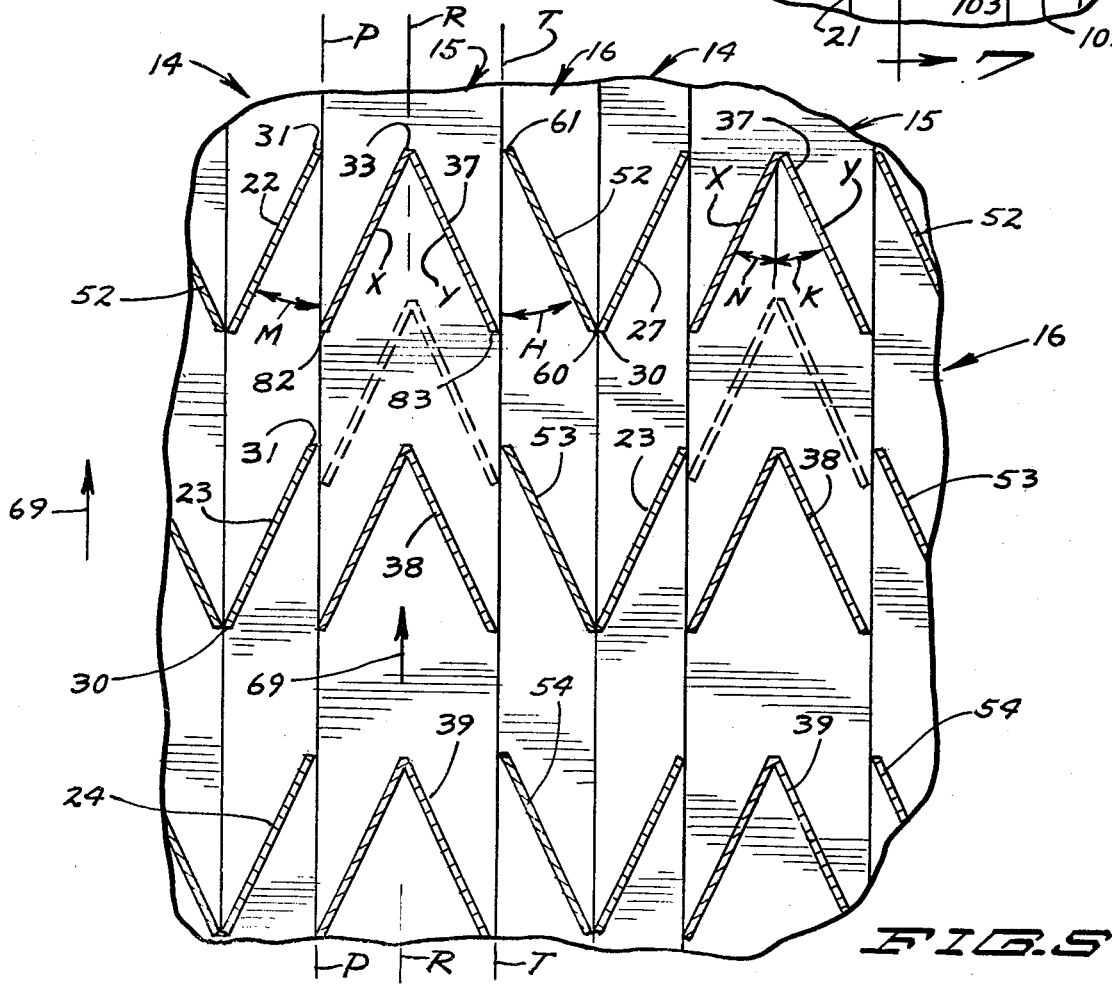

UNIDIRECTIONAL ROTATION TURBINE APPARATUS WITH REVERSE FLOW

BACKGROUND OF THE INVENTION

Turbine apparatus having a rotor assembly to be driven by fluid flow in either axial direction through the housing.

In the prior art it is known to provide turbine apparatus that is driven by fluid passing in either axial direction through the turbine housing, see for example U.S. Pat. No. 2,098,876. However, with such prior art apparatus when the fluid flows through the housing in one axial direction the turbine shaft is rotated in one angular direction, and is rotated in the opposite angular direction when the fluid flow is in the opposite axial direction.

In order to provide turbine apparatus that has a turbine shaft driven in the same angular direction regardless of the axial direction of fluid flow through the turbine housing as well as provide other improvements, this invention has been made.

SUMMARY OF THE INVENTION

Turbine apparatus that includes a turbine housing in which the blades of the stator assemblies that are adjacent and on opposite sides of a rotor assembly are oppositely inclined relative to a plane perpendicular to the turbine shaft that passes through the rotor assembly. Each rotor blade has blade portions that are inclined relative the above mentioned plane at angles above the same as the angles of inclination of the adjasent stator assembly.

One of the objects of this invention is to provide new and novel turbine apparatus having a rotor assembly that is driven in the same angular direction even though the axial direction of fluid through the turbine housing is reversed. A further object of this invention is to provide a new and novel stator and rotor blade arrangement in a turbine housing.

BRIEF DESCRIPTION OF THE DRAWINGS

FIG. 1 is a schematic representation of the first embodiment of turbine apparatus of this invention situated in a dam wall to have water flow therethrough;

FIG. 2 is a transverse cross sectional view generally taken along the line and in the direction of the arrows 2—2 of FIG. 1 to show a stator assembly in the turbine housing;

FIG. 3 is a longitudinal cross sectional view generally taken along the line and in the direction of the arrows 3—3 of FIG. 2, axially intermediate parts being broken away;

FIG. 4 is an enlarged fragmentary cross sectional view generally taken along the line and in the direction of the arrows 4—4 of FIG. 2 to show the arrangement of the rotor and stator blades;

FIG. 5 is an enlarged fragmentary cross sectional view generally taken along the line and in the direction of the arrows 5—5 of FIG. 2 (radial outer annular rotor and stator members rolled out flat) to show the intersection of the blades with said annual members, the dotted line showing of rotor blades being for a different angular position of rotor blades relative stator blades from the solid line showing thereof;

FIG. 6 is a fragmentary, somewhat diagrammatic, showing of a second embodiment of the invention depending mounted on a float;

FIG. 7 is a fragmentary transverse cross sectional view generally taken along the line and in the direction of the arrows 7—7 of FIG. 6 showing a driven gear in intermeshing relationship with gear teeth on a rotor assembly; and FIG. 8 is a fragmentary longitudinal cross sectional view generally taken along the line and in the direction of the arrows 8—8 of FIG. 7.

Referring now to FIGS. 1-5, the first embodiment of this invention, generally designated 10, includes a tubular housing 11 housing a first end 12 and axially opposite end 13. Within the housing there is mounted one or more sets of first stator assembly 14, a rotor assembly 15 and a second stator assembly 16, each being generally designated. The first stator assembly includes a hub 18 that mounts a bearing 17 to have elongated shaft 19 rotatably extended through the hub, a radially outer, annular mounting member 20 that is concentric to the hub and has an outer circumferential wall forming a close fit with the inner peripheral wall of the housing and a plurality of circumferential spaced blades 21-28 having radially inner edges joined to hub 18 and radially outer edges joined to the inner peripheral wall of the mounting member. Each of the blades 21-28 is of a plannar construction, has a radially extending edge 30 that is axially remote from the adjacent rotor assembly, a radially extending edge 31 that is adjacent the rotor assembly, and is inclined at substantially the same angle M (in the same angular direction about the shaft) to a plane P—P that is perpendicular to the axis of rotation of the shaft and passes through all the edges 31. The edges 30 and 31 of each blade are generally parallel.

The rotor assembly 15 includes a hub 35 that is keyed or otherwise fixed to shaft to cause the shaft to rotate when the rotor is driven, and a plurality of rotor blades 36-43 having radial inner edges joined to the hub and radially outer edges joined to the inner peripheral wall of the annular mounting member 44. The annular member 44 is concentric to hub 35 and has a circumferential outer wall that forms a close rotating fit with the housing inner peripheral wall. Each of the rotor blades is of a generally V-trough shape and has a first leg portion X that is axially adjacent the stator assembly 14 and a second leg portion Y that is axially adjacent the stator assembly 16, the leg portions of each blade being joined at the blade vertex edge 33. The legs X and Y of each rotor blade are planar and inclined at substantially equal, but opposite angles N and K respectively relative a plane R—R that is parallel to plane P—P and passes through the vertexes of all of the rotor blades of one rotor assembly.

The second stator assembly is of the same construction as the first stator assembly except that the blades thereof are inclined opposite to those of the first stator assembly. That is the second stator assembly includes a hub 50 having the shaft 19 rotatably extended thereinto and a plurality of blades 51-58 that have their radially inner edges joined to hub 50 and their radially outer edges joined to the inner circumferential surface of an annular mounting member 59 that is concentric to the hub 50 and has an outer circumferential surface that forms a close rotating fit with the tubular housing. Each of blades 51-58 is planar and has a radially extending edge 60 that is axially remote from the adjacent rotor assembly, a radially extending edge 61 that is adjacent the rotor assembly, and is inclined at substantially the same angle—angle H (in the same angular direction about the shaft) to a plane T—T that is perpendicular to the axis of rotation of the shaft and passes through all of the edges 61. Thus, the angle of inclination H of blades 51-58 relative to plane T—T is substantially the same as that of leg portions X relative to plane R—R. Each of leg portions is of the same size and shape while the edges 82, 83, 33 of each rotor blade are parallel to one another.

In the direction of normal rotation of the rotor assembly (arrow 69) and at the same radial spacing from the respective hub, each rotor blade has its radially extending edges 82 and 83 for leg portions X and Y respectively angularly rearwardly of its vertex edge, each first assembly stator blade has its remote edge 30 angularly rearwardly of its adjacent edge 31, and each second assembly stator blade has its remote edge 60 angularly rearwardly of its adjacent edge 61. Additional sets of stator and rotor assemblies 14-16 may be provided in the tubular housing with the rotor assemblies keyed to the shaft 19 and the shaft rotatably extend through the stator hubs and each additional first stator assembly adjacent the second stator assembly of another set. The second set of rotor and stator assemblies may be in abutting relationship (first stator assembly of one set abutting the second stator assembly of the second set) or the second set may be substantially spaced from the first set.

The shaft 19 is connected by a conventional drive connection, indicated by dotted line 65, to the apparatus 66 that is to be driven, for example an electric generator.

As water flows through the turbine housing in the general axial direction of arrow 67 and as it flows between blades 21-28, the direction of flow is changed to be generally in the direction of arrow 68 whereby as the water flows between the rotor blades the rotor blades are forced to rotate in the direction of arrow 69 to cause the shaft 19 to rotate in the same direction. Thence the water in flowing between the blades 51-58 flows generally in the direction of arrows 70 and thence flows between another first stator assembly 14 and etc, if provided, and subsequently exits from the turbine housing. In the event the general direction of water flow through the housing is in the axial direction of arrow 72, the water in flowing between blades 51-58 has its flow direction change to that of arrow 73 so that as it flows between the rotor blades, the rotor blades are caused to rotate in the direction of arrow 69. With this invention the water flow through the housing may be in either axial direction and the rotor assembly is driven in the same angular direction. Thus, the turbine apparatus of this invention may be used to obtain power both when an ocean tide is coming in and when the tide is going out and no gearing or transmission mechanism is required between the turbine shaft and the driven shaft of apparatus 66 to reverse the direction of drive from shaft 19 to that apparatus 66 when apparatus 66 is to have the drive thereto provided in the same angular direction. Further, the turbine apparatus can be used when the flow is continuously in one direction, for example when located in a river.

Referring now to FIGS. 6-8, the second embodiment of the turbine apparatus of this invention, generally designated 100, is of the same construction as the first embodiment except for the differences noted hereinafter. The second embodiment includes a tubular housing 101 in which there is mounted at least one set of a first and a second assembly and a rotor assembly, the rotor assembly being mounted on the turbine shaft 19 for rotation relative thereto. Further, the radially outer surface portion of the rotor annular mounting member 102 of the rotor assembly, generally designated 99, of the second embodiment is provided with gear teeth 103 that are in intermeshing relationship with the gear teeth 104 of a power take off gear 105. The gear 105 is keyed to a power take off shaft 106 that rotatably extends through a gear housing 107. The turbine housing is provided with an opening 108 to have the gear 105 extend therethrough to be in driven relationship to the rotor assembly. Advantageously the axial length of each of the gear 105 and opening 108 is less than that of rotor annular mounting member 102 and the gear housing is in fluid sealing relationship with the tubular housing 101. The shaft 106 is connected through a suitable drive connection to the apparatus that is to be driven.

If there are provided a plurality of sets of rotor and stator assemblies, then there are likewise provided a plurality of sets of gears 105 that are keyed to shaft 106 and extended through openings 108. There may be provided a gear housing 107 for each gear 105, or a single gear housing for all of the gears 105.

Either of the embodiments may be mounted in a dam wall 80 as indicated in FIG. 1 for the first embodiment, or may be mounted on a float (barge or ship) 110 as indicated in FIG. 6 for the second embodiment. With reference to FIG. 6, straps 111 are secured to the float 110 to mount the turbine apparatus in depending relationship to the float 110. Advantageously baffle structure, generally shown as 115 and 116, may be mounted on the float to direct (funnel) water into either end of the turbine housing 101, the baffle structure flaring radially outwardly in a direction away from the adjacent end of the turbine housing. Additionally the surfaces 80a, 80b of wall 80 are shaped to funnel water into either end of the first embodiment. This would serve to increase the rate of flow of water through the turbine housing over that which would occur if no such baffle structure were provided.

Advantageously the turbine housing can be mounted on float 110 to have the gear housing 107 extend upwardly through an opening therein so that the shaft 106 would be located in the interior of the float. In such a case a suitable fluid seal would be provided to prevent water leaking through such a float opening.

Even though the rotor blades have been described as being V-shaped, it is to be understood that leg portions thereof could be curved adjacent the juncture thereof. Additionally even though the radially extending edges of each of the blades has been described as being parallel, it is to be understood that the edges thereof (other than at the juncture of leg portions X and Y) could diverge from one another in a direction radially away from the respective hub. Also even though it has been indicated that each rotor and stator assembly has eight blades, it is to be understood that there may be provided a greater number, or a smaller number of blades.

Even though as viewed in FIG. 2, there is seen a triangular shaped spacing between adjacent blades of radially adjacent the annular mounting member, for example between blades 21, 22 and mounting member 20, it is preferred that each of the rotor and stator assemblies have a sufficient number of blades, or the circumferential dimensions of the blades be such, that in viewing each such assembly in an axial direction no such spacing be seen.

What is claimed is:

1. Turbine apparatus comprising a tubular housing that is open at either axial end thereof, a shaft in the housing, a rotor assembly having the shaft extended axially therethrough and mounted in the housing for normal rotation in one angular direction about an axis rotation, the rotor assembly having a rotor hub and a plurality of circumferentially spaced blades extending radially outwardly of the rotor hub, a first stator assembly adjacent and on one axial side of the rotor assembly that includes a first stator hub and a plurality of circumferentially spaced stator blades extending radially outwardly of the first stator hub, and a second stator assembly adjacent and on the axially opposite side of the rotor assembly that includes a second stator hub and a plurality of circumferentially spaced stator blades extending radially outwardly of the second stator hub, each of the first stator blades in the angular direction of the normal rotation of the rotor assembly being inclined at about the same angle relative to a plane perpendicular to the axis of rotation of the rotor assembly and that passes through the first stator blades, and each of the second stator blades in the angular direction of normal rotation of the rotor assembly being inclined at about the same angle relative to a plane perpendicular to the axis of rotation of the rotor assembly and that passes through the second stator blades, the angle of inclination of the first stator blades being about equal and opposite to the angle of inclination of the second stator blades, the rotor blades having radially extending first leg portions axially adjacent the first stator assembly that in the angular direction of normal rotation of the rotor assembly are inclined at about the same angle relative to a plane perpendicular to the axis of rotation of the rotor assembly and that passes through the rotor blades, the angle of inclination of the first leg portions relative the last mentioned plane being in the same direction as the angle of inclination of the first stator blades relative the first mentioned plane, each rotor blade being of a generally V trough shape and having a vertex and a second leg portion joined to a first leg portion at the vertex, said plane that passes through the rotor blades passing through the rotor blade vertexes and the second leg portions being inclined relative the last mentioned plane at angles about equal and opposite the angles of inclination of the first leg portions relative the same plane.

2. Turbine apparatus comprising a tubular housing that has a fluid flow opening at either axial end thereof, a shaft in the housing, a rotor assembly having an axis of rotation and having the shaft extended axially therethrough, said rotor assembly being mounted in the housing for normal rotation in one angular direction about said axis and having a rotor hub and a plurality of circumferentially spaced, generally V-shaped blades extending radially outwardly of the rotor hub, each rotor blade having a vertex portion, a first stator assembly adjacent and and one axial side of the rotor assembly that includes a first stator hub and a plurality of circumferentially spaced stator blades extending radially outwardly of the first stator hub, and a second stator assembly adjacent and on the axially opposite side of the rotor assembly that includes a second stator hub and a plurality of circumferentially spaced stator blades extending radially outwardly of the second stator hub, each rotor blade having axially opposite, radially extending edges that are angularly rearwardly of its vertex portion in the direction of normal rotation of the rotor assembly, each stator assembly blade having a radially extending edge that is remote from the rotor assembly and a radially extending edge that is adjacent the rotor assembly, the remote edge of each stator blade being angularly rearwardly of the blades adjacent edge with reference to the normal direction of rotation of the rotor assembly.

3. The apparatus of claim 2 further characterized in that each of the first stator blades in the angular direction of the normal rotation of the rotor assembly is inclined at about the same angle relative to a plane that is perpendicular to the axis of rotation of the rotor assembly and passes through the first stator blades, and that each of the second stator blades in the angular direction of normal rotation of the rotor assembly is inclined at about the same angle relative to a plane perpendicular to the axis of rotation of the rotor assembly and that passes through the second stator blades, the angle of inclination of the first stator blades being about equal and opposite to the angle of inclination of the second stator blades.

4. The apparatus of claim 2 further characterized in that each of the first stator blades in an angular direction of the normal rotation of the rotor assembly is inclined at about the same angle relative to a plane that is perpendicular to the axis of rotation of the rotor assembly and passes through the first stator blades, and that each of the rotor blades includes a radially extending first leg portion and a radially extending second leg portion which is joined to the first leg portion at the blade vertex, the first leg portions being adjacent the first stator assembly, the first and second leg portions in the angular direction of normal rotation of the rotor assembly being inclined at about equal angles relative to a plane that is perpendicular to the axis of rotation of the rotor assembly and passes through the vertex of the rotor blades with the angle of inclination of the first leg portions being opposite that of the second leg portions, the angle of inclination of the first leg portions relative the last mentioned plane being about equal in the same angular direction as the angle of inclination as that first stator blades relative said plane that passes through the first stator blades.

5. The apparatus of claim 4 further characterized in that the stator blades are planar and that the first leg portions are planar.

6. The apparatus of claim 2 further characterized in that the rotor assembly is fixed to the shaft for drivingly rotating the shaft and that the shaft rotatably extends through the first stator assembly.

7. The apparatus of claim 6 further characterized in that the rotor assembly includes an annular mounting member having a circumferential inner surface and that the rotor blades have radially outer edges joined to said circumferential inner surface.

8. The apparatus of claim 2 further characterized in that the rotor assembly includes an annular mounting member having a circumferential outer surface portion that has gear teeth and a circumferential inner surface, that the rotor blades have radially outer edges joined to said circumferential inner surface and that there is provided a second shaft located outside of the tubular housing and a gear mounted on the second shaft in intermeshing relationship with the annular mounting member gear teeth, the tubular housing having an opening for the gear to extend through.

9. The apparatus of claim 8 further characterized in that there is provided a gear housing having the gear located therein, the second shaft rotatably extending through the gear housing, the gear housing being mounted on the tubular housing, and a float, the tubular housing being depending mounted on the float.

* * * * *